United States Patent [19]

Stava

[11] Patent Number: 5,001,326

[45] Date of Patent: Mar. 19, 1991

[54] APPARATUS AND METHOD OF CONTROLLING A WELDING CYCLE

[75] Inventor: Elliott K. Stava, Brecksville, Ohio

[73] Assignee: The Lincoln Electric Company, Cleveland, Ohio

[21] Appl. No.: 475,755

[22] Filed: Feb. 6, 1990

Related U.S. Application Data

[60] Continuation-in-part of Ser. No. 404,769, Sep. 8, 1989, which is a division of Ser. No. 270,766, Nov. 14, 1988, Pat. No. 4,866,247, which is a continuation-in-part of Ser. No. 135,832, Dec. 21, 1987, abandoned, which is a continuation-in-part of Ser. No. 940,580, Dec. 11, 1986, Pat. No. 4,717,807.

[51] Int. Cl.$^5$ .............................................. B23K 9/10
[52] U.S. Cl. ........................... 219/137 PS; 219/130.21
[58] Field of Search .................... 219/137 PS, 130.21, 219/137.71

[56] References Cited

U.S. PATENT DOCUMENTS

| | | | |
|---|---|---|---|
| 3,459,920 | 8/1969 | Sevenco | 219/130.21 |
| 3,792,225 | 2/1974 | Needham | 219/130.21 |
| 3,809,853 | 5/1974 | Manz | 219/137 |
| 4,020,320 | 4/1977 | Pijls | 219/137 PS |
| 4,544,826 | 10/1985 | Nakanishi et al. | 219/137 PS |
| 4,546,234 | 10/1985 | Ogasawara | 219/137 PS |
| 4,717,807 | 1/1988 | Parks | 219/130 |
| 4,794,232 | 12/1988 | Kimbrough et al. | 219/130.51 |
| 4,866,247 | 9/1989 | Parks | 219/137 |

FOREIGN PATENT DOCUMENTS

| | | |
|---|---|---|
| 1565157 | 2/1970 | Fed. Rep. of Germany . |
| 854639 | 8/1981 | U.S.S.R. . |

OTHER PUBLICATIONS

A Power Source for Advanced Welding Systems, by P. Budai et al., First International Conference on Advanced Welding Systems, Nov., 1985.
A Power Source for Gas Shielded Arc Welding with New Current Wave Forms, by T. Ogasawara et al., First International Conference on Advanced Welding Systems, Nov., 1985.
Control of Short Circuiting in MIG Welding, P. Boughton et al., Welding Research International, 1974 Ed.
Patent Abstracts of Japan, vol. 10, No. 83 (M-466), [2140], Apr. 2, 1986.
Patent Abstracts of Japan, vol. 9, No. 202 (M-405), [1925], Aug. 20, 1985.
Patent Abstracts of Japan, vol. 4, No. 161 (M-40), [643], Nov. 11, 1980.
Study of Welding Arc Control in China, by J. L. Pan, 231 Welding Journal 65 (1986), Mar., No. 3, Miami, Fla. U.S.A.
European Search Report, Application Ser. No. 87302155.4, Apr. 28, 1988.
Method for Controlling Energy of "Little Bridge", Explosion in $CO_2$ Welding, Welding Abroad, No. 1, 1981, pp. 17–20.

Primary Examiner—Clifford C. Shaw
Attorney, Agent, or Firm—Body, Vickers & Daniels

[57] ABSTRACT

An improvement in a short circuiting arc welding apparatus of the type including a power supply for causing a welding current of different levels to pass through a welding wire extending at variable extension distances from a holder and between the wire and a workpiece at a molten metal pool on the workpiece. This improvement includes control means for maintaining a generally constant wattage in the wire during the plasma boost portion of the arcing condition as the extension distance from the holder changes. Further, the improvement involves controlling the plasma or arcing condition after a plasma boost by a current curve gradually decreasing from the plasma boost portion toward the background current level for the system.

41 Claims, 7 Drawing Sheets

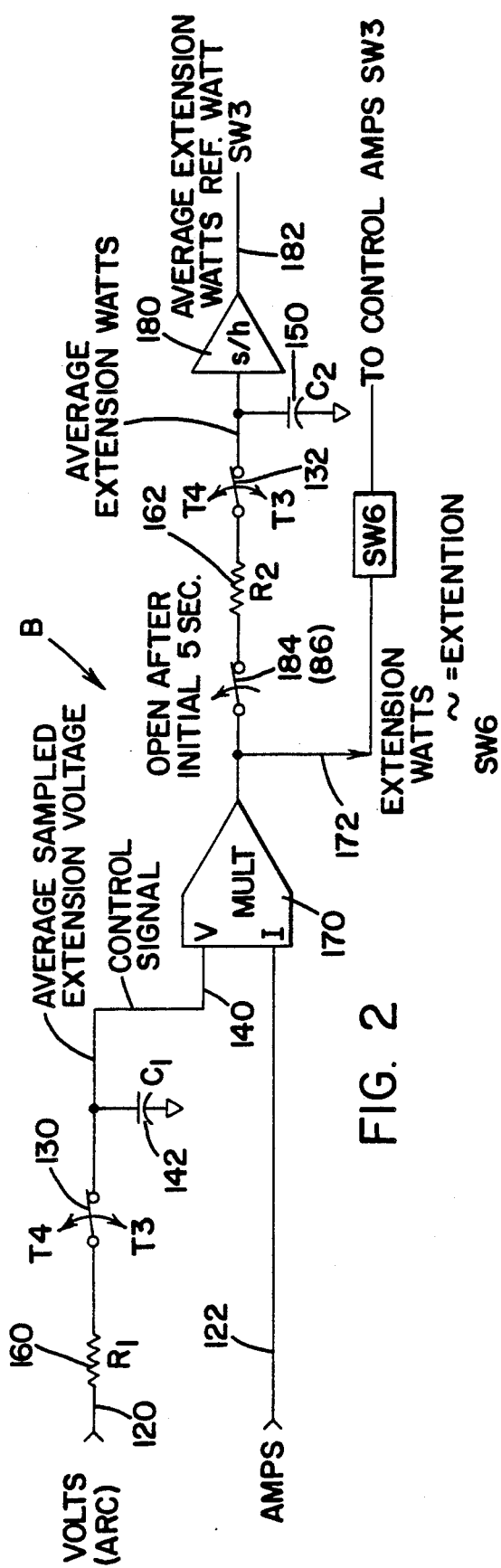
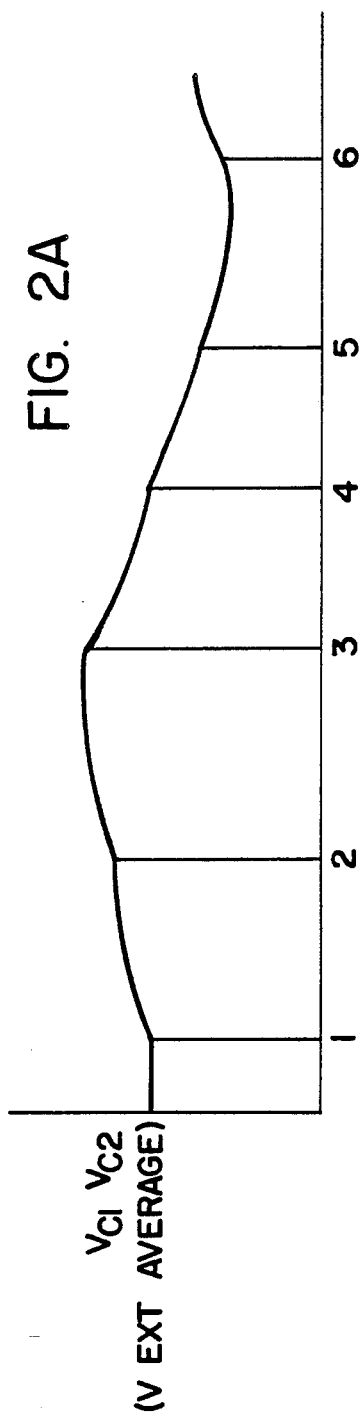
FIG. 2
FIG. 2A

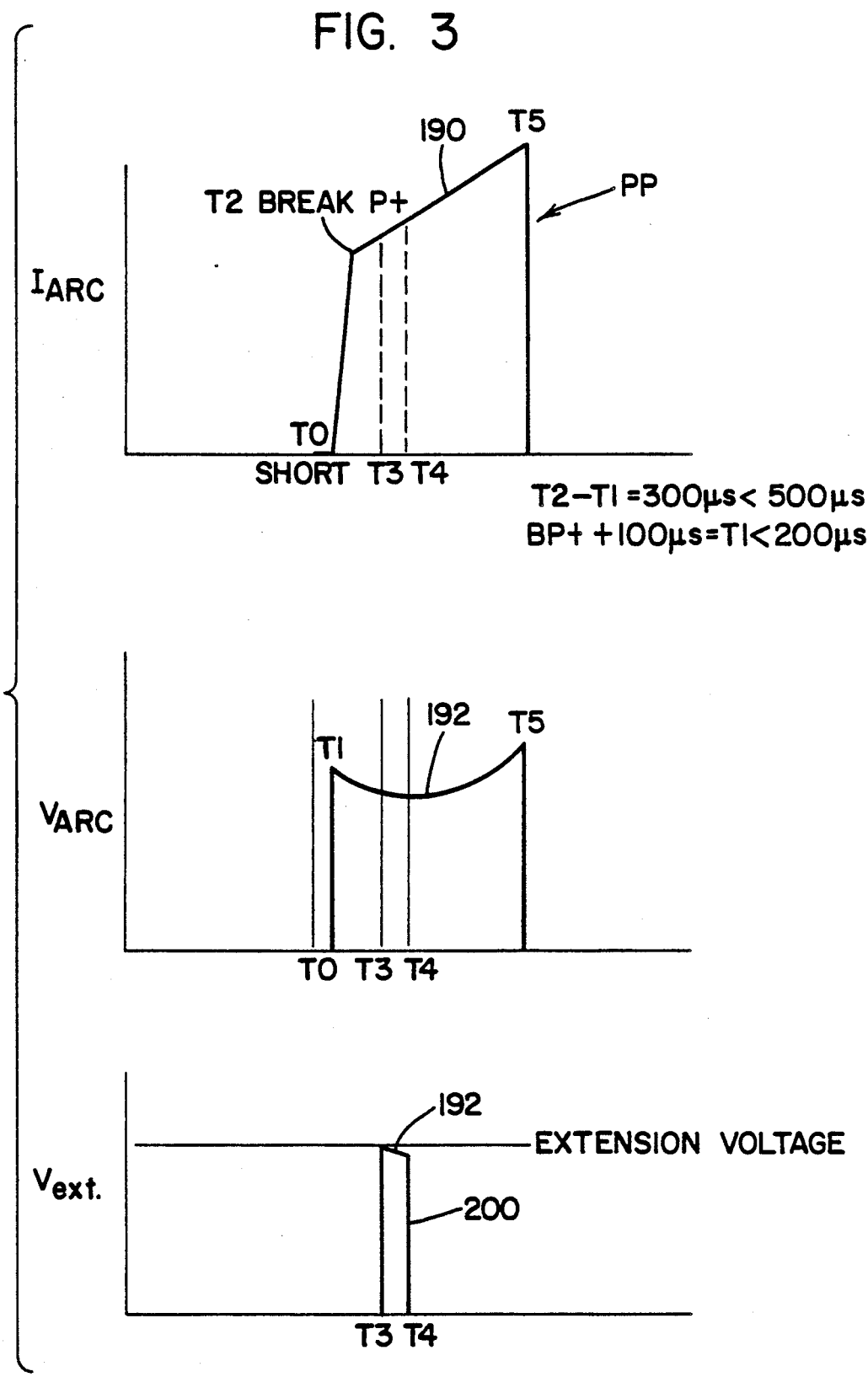

APPARATUS AND METHOD OF CONTROLLING A WELDING CYCLE

This application is a continuation-in-part application of prior pending application Ser. No. 404,769, filed Sept. 8, 1989, pending, which is continuation in-part of prior co-pending application Ser. No. 270,766 filed Nov. 14, 1988, now U.S. Pat. No. 4,866,247, which is a continuation-in-part of prior co-pending application Ser. No. 135,832 filed Dec. 21, 1987, now abandoned, which is in turn a continuation-in-part of prior application Ser. No. 940,580 filed Dec. 11, 1986, now U.S. Pat. No. 4,717,807.

This invention relates to the art of arc welding using a consumable electrode and more particularly to an improved apparatus and method of short circuiting arc welding.

Incorporation by Reference

The present invention relates to an improvement in spatter control systems of the general type described in applicant's U.S. Pat. No. 4,866,247 and U.S. Pat. No. 4,717,807. These issued patents are incorporated by reference herein as background information and for their discussion of concepts in the spatter control art to which the present invention is specifically directed. In addition, Pijls et al 4,020,320 relating to a short-circuit arc welding system attempting to obtain a constant bead size, is also incorporated by reference herein.

BACKGROUND

In recent years, a substantial amount of effort has been devoted to improving short circuiting arc welding by controlling the various portions of the welding cycles, each constituting a short circuit condition followed by an arcing condition. During the short circuit condition, a molten metal ball formed on the end of the advancing welding wire engages the molten metal pool on the workpiece causing a high current flow through the consumable welding wire and molten metal ball. This short circuit condition is terminated by an electrical pinch action causing the metal forming the molten ball on the wire to electrically constrict and then break away from the welding wire in an explosion type action often referred to as a "fuse" or "the fuse". Controlling current flow during the short circuit portion of the welding cycle is accomplished by the power supply control circuit. In addition, a premonition circuit is usually provided so that a given increase in dv/dt indicates an imminent formation of the fuse. Consequently, the welding current can be dropped to a background level $I_B$, or to a lower value, immediately before the fuse occurs. In this fashion, the energy of the fuse during each welding cycle is drastically reduced. This reduces spatter at the termination of the short circuit condition. Various circuits for controlling the current flow during the short circuit portion or condition of the welding cycle are known in the art as spatter control circuits since the fuse is considered to be a primary source of spatter during short circuiting arc welding. Other spatter producing dynamics of the welding process have been recognized by applicant and prior patents have provided novel control concepts to reduce spatter caused by such dynamics. One concept was to provide a high energy pulse following a slight time delay after the fuse so that the arcing condition subsequent to the fuse could be initiated by a high energy current pulse sometimes referred to as a "plasma boost" pulse. By using a high energy plasma boost current pulse immediately upon initiation of an arcing condition in the welding cycle, melting by anode heating at the tip of the welding wire being fed toward the molten metal pool on the workpiece occurred rapidly. This rapid melting allowed formation of a molten metal ball on the end of the wire of a uniform size, which ball was then moved toward the pool of molten metal as the wire was fed toward the workpiece. After the plasma boost pulse of current, a plasma condition was created by reducing the welding current to a level below the plasma boost level, but greater than the background current level. This reduced current mode was then terminated and a background current $I_B$ was passed through the arc to maintain the molten condition of the molten ball until the next short. By controlling the current level and using a fixed time for the plasma boost pulse, the energy in the plasma boost pulse was regulated. The end of the wire was melted to form a molten metal ball having a somewhat uniform size based upon an amount of energy applied during the plasma boost current pulse and then the plasma portion. After the plasma portion, the arc was operated at a background current level maintaining a molten condition until the short circuit occurred.

In the past, the amount of energy introduced into the wire during the arcing condition of the welding cycle has been controlled to produce a selected amount of melting energy. The plasma boost and subsequent plasma condition was controlled in a manner to control the amount of energy introduced into the wire as it was being melted preparatory to being shorted and transferred by surface tension from the welding wire to the molten metal bath on the workpiece. It has been suggested to provide a constant watt control for the plasma boost portion of the plasma employed to melt the advancing welding wire. To accomplish this, in the past, the joules were measured during the pinch cycle, plasma boost portion and the arc plasma portion of the welding cycle. When the joules accumulated to a certain level, the plasma portion of the cycle was terminated and the current was held at the background level awaiting a subsequent short circuiting condition. Thus, a fixed energy accumulation occurred during each plasma boost and plasma portion of the welding cycle by terminating the plasma time when the measurement of accumulated energy reached a certain level. This process worked extremely well in the field. However, changes in the wire extension are reflected as relatively small changes in the total energy introduced during a given welding cycle. Consequently, it is difficult to accurately control the welding current to compensate for relatively small changes in the wire extension from one welding cycle to the next. Thus, accuracy of the applied energy varied with changes in extension or stick out.

In addition, the prior spatter control systems, which are vastly improved over other systems, involves a rapid decrease in the current between the plasma boost portion of the heating cycle and the plasma portion, which second portion is subsequently terminated when the accumulated energy reaches a given level. This rapid decrease in welding current flow from the plasma boost portion to the plasma portion can cause certain agitation of the weld puddle that can result in inadvertent shorting and other spatter producing mechanics. Further, when such shorting occurs during the plasma portion of the cycle, the pinch circuit control is initiated at once.

This pinch control operation will cause current flow at a high level resulting in a rapid separation of the metal joined during this inadvertent short. Such rapid separation of the metal occurs before the premonition circuit (dv/dt circuit) is initiated; therefore, the fuse is not detected and there is no immediate drop in the welding current prior to metal separation. Consequently, such metal separation is at high current and can result in a certain amount of spatter.

The present invention relates to an apparatus and method for controlling the spatter in a welding process of a short circuiting type welding operation and it will be described with respect to this type of welding; however, the invention has certain broader applications which will be apparent during the description of the invention. The present invention relates to a further refinement of a spatter control system of the type described in the patents incorporated by reference herein and overcomes the specific situations described in the introductory portion of this disclosure.

In accordance with one aspect of the invention, compensation is provided for small changes in the welding wire extension which can result in slight differences in the melting energy introduced into the welding wire during the plasma portion of the welding cycle and, thus, cause some differences in the ball size. In accordance with this aspect, the voltage drop in the wire extension is measured during the early portion of the pinch portion of the welding cycle. This measurement of the extension voltage is accomplished when the pinch current is near the same magnitude during each successive welding cycle and is done over a very short time, less than 500 microseconds. As the wire extension changes during the welding process, the difference in the extension length is reflected as a change in the measured voltage during the pinch portion of the welding cycle. This short duration voltage measurement is taken when the current is nearly uniform and produces a series of voltage spikes having a short duration and a voltage magnitude equal to the product of applied pinch current and electrode extension in terms of resistance. The magnitude of the measured voltage level is proportional to the actual extension of the wire. The level is recorded by averaging the voltage levels of the thin voltage spikes during subsequent short circuit cycles. The average voltage level or value is a measurement of the wire extension length and is the voltage across the extension during the welding cycle. This extension length in voltage form is multiplied by the current during the plasma boost pulse so that the wattage during a plasma boost pulse is controlled by the averaged extension voltage. The product of the extension voltage and the current during the plasma boost portion of the welding cycle is then compared to a reference value for the wire wattage for the purpose of controlling the welding current. This concept maintains a constant electrode extension wattage during each subsequent plasma boost portion of the welding cycle. Consequently, the same size ball is melted and produced on the end of the wire during each plasma boost portion regardless of variations in the extension of the wire from the wire holder. This type of circuit is an improvement over prior spatter control systems and substantially enhances the ease of welding, while still maintaining the desired spatter control. The operator adjusts the reference wattage prior to a welding procedure by holding the extension at the desired value during initial welding. The current flow during the plasma boost portion of the welding cycle is controlled to maintain the actual wattage in the welding wire to a desired level, irrespective of variations in the extension length.

In accordance with another aspect of the invention, the reference wattage for the plasma boost is created by employing the same thin voltage spike measuring concept for determining the wire extension voltage over a relatively short time and at a precise location during the pinch portion of the welding cycle. At this short condition, the voltage is the extension or stick out voltage. When an operator initially starts the welding run or procedure, the welding current during the plasma boost portion of the welding cycle is controlled to obtain a fixed current during the power boost portion. However, the actual measured voltage levels indicative of the actual extension length at the start up of the procedure are stored and saved during this initial start up process. Thus, while the operator maintains the desired stick out during the initial start up, the reference wattage value is created by multiplying the stored voltage spikes indicative of the desired extension by the subsequent plasma boost currents, averaging and storing this product as the reference wattage value. Thereafter, this initially created reference wattage is employed to control the welding current during the plasma boost portion of the welding cycle for the remainder of the run, in accordance with the averaged sample voltage levels measuring the actual wire extension at each pinch pulse, to maintain constant extension wattage during plasma boost. Since the voltage measurement both for the reference wattage start up procedure and the continuous welding operation is made during a short circuit condition, the measured voltage magnitude is indicative of the voltage in the wire during the short. This voltage changes according to the extension or stick out of the welding wire.

In accordance with another aspect of the present invention, a capacitor is charged to a voltage proportional to the general current level during the plasma boost portion of the welding cycle. After the plasma boost portion, the plasma portion is initiated. At this time, a rheostat discharges the charged capacitor and the current level of the plasma portion follows a time constant curve created by this discharging action. This discharge action causes a voltage to decay along a time constant curve from a high level indicative of the current level during the plasma boost to a low level during the plasma portion. The control system causes the welding current to flow in a curve matching this decaying voltage curve. In this manner, there is a decay of the current after the plasma boost portion to prevent a rapid decrease in the current between these two arc portions of the melting operation for the wire. This procedure reduces the puddle agitation by slowing reducing the welding current instead of abruptly reducing the welding current as previously done after the plasma boost. Instantaneous reduction of the welding current after the plasma boost portion and before the plasma portion caused changes in the pressure exerted on the welding puddle and caused a certain amount of metal agitation. By reducing the current in a slow, continuous decay, the arc pressure on the melted pool is slowly reduced. This action dampens the weld puddle agitation. The time constant for the current decay can be changed by adjusting the rheostat. The plasma portion of the cycle can be instantaneously switched to the background current level in an abrupt fashion to terminate the plasma portion when the melting energy reaches a certain level. This switch action is done at a lower current level and does not cause agitation of the molten metal in the puddle. By providing a maximum time for the plasma portion, the plasma portion of the welding cycle does not have an excessively long decay time, which could occur if a high time constant were employed in the decay circuit. This aspect of the present invention gradually reduces the plasma current and maintains a quiescent pool to reduce the likelihood of an inadvertent short circuit.

In accordance with another aspect of the present invention, there is provided an arrangement for dealing with an inadvertent short circuit during the plasma boost or plasma portion of the welding cycle. It is possible that during the arc condition of the welding cycle a short can occur. This short is sensed by an abrupt decrease in arc voltage, which detection initiates the pinch pulse including its initial delay. Since the metal contact is caused by a movement of the puddle to contact the electrode, during the initial delay of the pinch cycle, gravity tends to pull the metal away from the electrode. This can cause a reduced metal contact area during this inadvertent short. The metal may be separated quite rapidly by the high current flow to create a fuse before the premonition dv/dt circuit can be initiated at the normal break point. This could cause severe puddle agitation by the break of the premature short. This premature short can occur when a portion of the weld puddle rises and contacts the molten metal of the end of the welding wire. Surface tension and gravity then abruptly pull the shorted, melted mass of metal back into the weld puddle. The surface tension breaks the fuse before the premonition circuit can be activated. This causes spatter.

In accordance with another aspect of the present invention, a premature, inadvertent short condition is detected by an increased voltage. If it is determined that this increased voltage is not a normal short, the break point of the pinch pulse is immediately lowered to a substantial current level, such as about 20% of the original break point current. By reducing the break point current, the pinch pulse shifts to the gradual current slope as soon as the pinch current increases to the preselected lower level, such as 20% of the normal maximum pinch current. Thus, a longer time is experience before separation of the metal and the premonition circuit can become active and allow control of the Darlington switches at the metal fuse to eliminate spatter caused by a high current break or fuse.

The primary object of the present invention is the provision of a method and apparatus for maintaining a generally constant wattage in the welding wire of a welding operation during the plasma boost portion of the welding cycle as the extension or stick out distance changes. In accordance with this object, an operator may manipulate a semi-automatic welder operating in the short circuiting mode in a manner changing the extension distance or stick out of the wire without substantially changing the operating characteristics of a spatter control system.

Yet another object of the present invention is the provision of a method and apparatus for maintaining a generally constant wattage in the wire forming the extension or stick out of a welding operation by creating an extension reference wattage, measuring the actual extension wattage at any given time during the welding procedure, comparing the measured wattage with the reference wattage to determine an error signal and using this error signal for controlling the welding current during the plasma boost portion of the welding cycle so that the plasma boost wattage is controlled at the reference wattage by controlling the welding current during the plasma boost portion of the welding cycle.

Still a further object of the present invention is the provision of a method and apparatus, as defined above, which method and apparatus involves creating a voltage spike during the pinch portion of the welding cycle and averaging these voltage spikes to give the voltage component for both the reference wattage and the instantaneous wattage. A comparison of signals representing these wattages are used to control the welding current during the power boost portion of the cycle.

Another object of the present invention is the provision of a method and apparatus, as defined above, which method and apparatus averages the measured extension voltage over several cycles for the purpose of creating a voltage level representing a reference extension wattage. This average also creates an continuously updates a voltage level representing the actual instantaneous wattage during the power boost portion of the welding cycle.

Still a further object of the present invention is the provision of a method and apparatus, as defined above, which method and apparatus controls the wattage directed to the welding wire during each welding cycle to control the size of the ball melted at the end of the welding wire during each plasma boost portion of the welding cycle, regardless of the extension or stick out length of the welding wire.

Another object of the present invention is the provision of a method and apparatus, as defined above, which method and apparatus substantially increases the ease of welding in a spatter control system allowing the operator to have certain latitude in positioning the holder for the welding wire during a given welding procedure or welding run.

Still another object of the present invention is the provision of method and apparatus for controlling the welding current level following the plasma boost portion of a welding cycle for spatter control, which method and apparatus causes the plasma current after the plasma boost pulse to gradually decrease or decay from the high plasma boost current level (such as about 300 amperes) toward the background welding current level (such as about 20 amperes).

Still a further object of the present invention is the provision of a method and apparatus as defined above, which method and apparatus controls the current level after the plasma boost pulse so that the welding current does not abruptly change from a generally high level value to a generally low level value, which abrupt change can cause a certain amount of pool agitation.

Yet a further object of the present invention is the provision of a method and apparatus, as defined above, which method and apparatus controls the welding current level after the power boost portion of the welding cycle in a manner to control the agitation of the molten metal pool immediately after the power boost portion of the welding cycle.

Yet another object of the present invention is the provision of a method and apparatus for controlling the break point of a pinch pulse of the welding cycle used in spatter control, which method and apparatus detects an inadvertent short during the arcing condition and immediately shifts the break point of the pinch pulse to a level substantially below the normal 60% break point current level. In accordance with this object, the preferred embodiment reduces the break point current to approximately 20% of the maximum pinch pulse current normally experienced in the welding cycle.

Yet another object of the present invention is the provision of an improved spatter control system for a short circuiting welding operation, which system may be employed for other welding operations and for the purpose of adjusting the stick out or extension in an automatic system, such as a robot control system.

These and other objects and advantages will become apparent from the following description of the present invention taken together with the drawings described below:

BRIEF DESCRIPTION OF DRAWINGS

FIG. 2 is a wiring diagram of the preferred embodiment of the present invention;

FIG. 2A is a voltage graph illustrating the level of voltage on the voltage averaging device employed in the preferred embodiment of the present invention as illustrated in FIG. 2;

FIG. 3 is a series of curves showing the voltage measuring scheme employed in the preferred embodiment of the present invention during the pinch pulse PP;

PREFERRED EMBODIMENT OF THE PRESENT INVENTION

Figure 1:
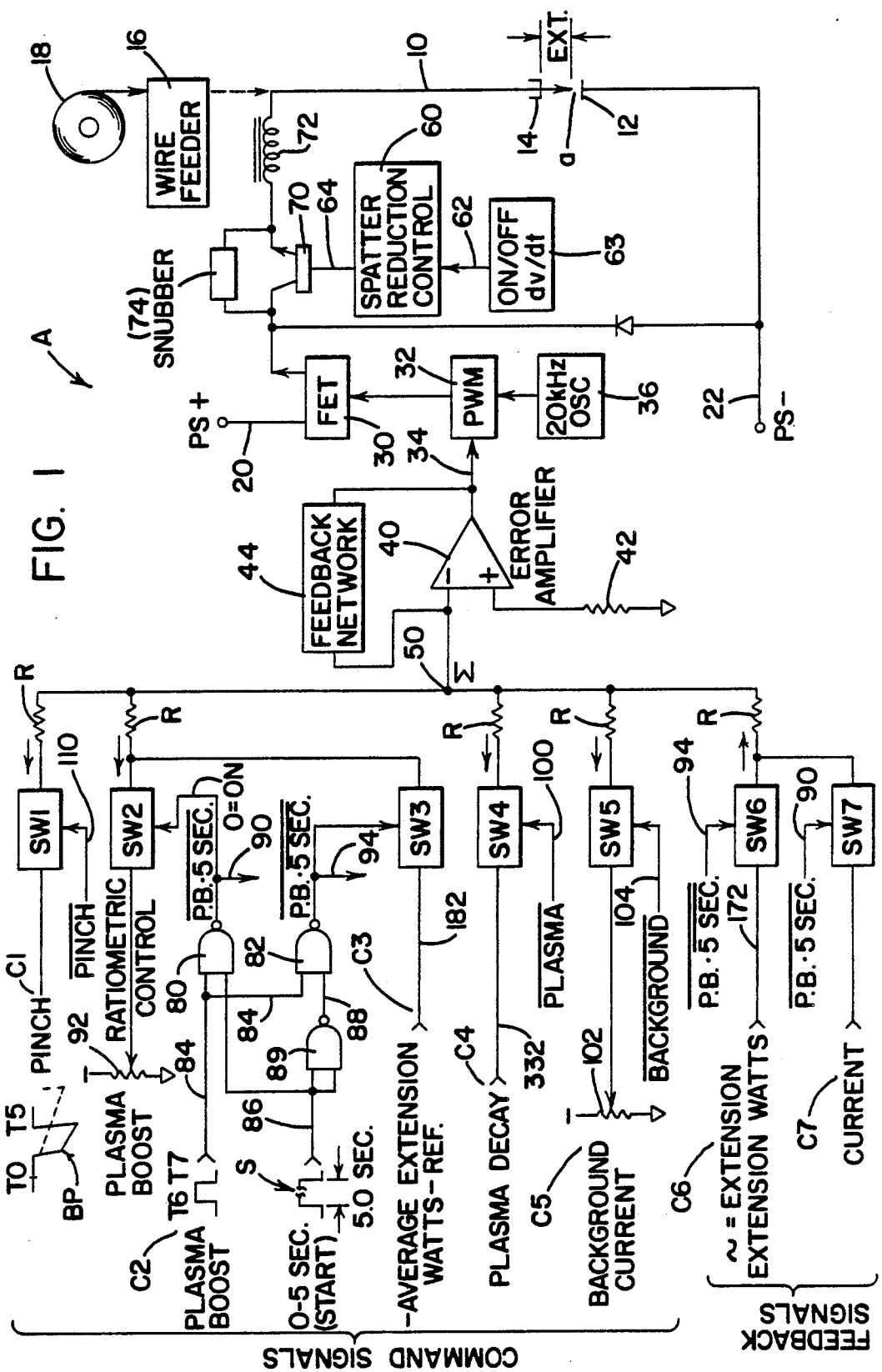
FIG. 1 is a schematic, combined wiring diagram and block diagram illustrating the preferred embodiment of the present invention.
Figure 4:
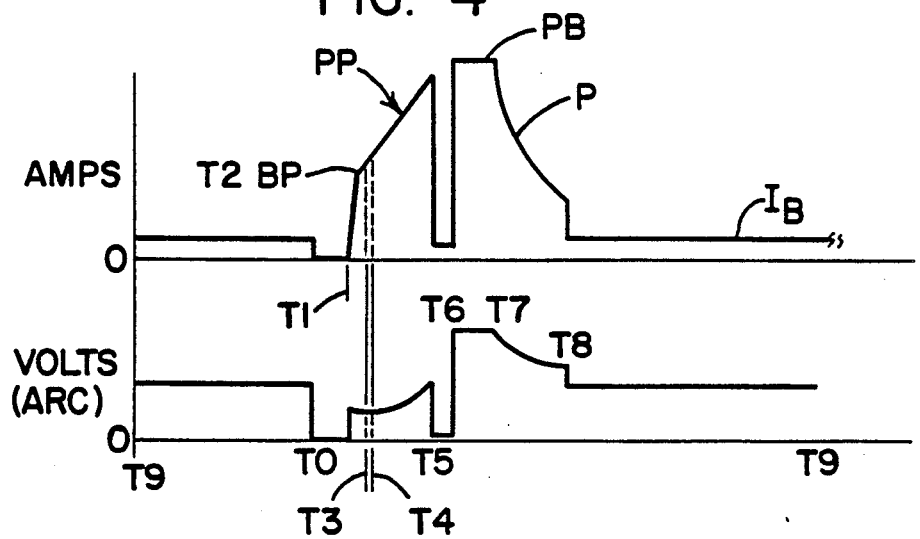
FIG. 4 are voltage and current graphs showing a single welding cycle employing the preferred embodiment of the present invention.

Referring now to the drawings wherein the showings are for the purpose of illustrating the preferred embodiment of the invention only, and not for the purpose of limiting same, FIG. 1 shows apparatus A for short circuiting welding using voltage responsive control circuits to accomplish reduced spatter. The present invention relates to an improvement in short circuiting arc welding of the type performed by apparatus A with a novel concept performed by a preferred circuit shown in FIGS. 1 and 2. Apparatus A includes a power supply input scheme using various distinct voltage responsive current controls for creating separate current portions of a cycle for short circuiting arc welding, as shown in FIG. 4. These control circuits are the voltages applied to the command signal lines and the feedback signal lines and are identified as C1-C7. Welding wire 10 is spaced from workpiece 12 while being supported in an electrical connector or holder 14. Wire 10 can be driven through holder 14 by an appropriate wire feeder 16 from a supply spool 18 at a rate determined by the operator. Holder 14 is connected to one terminal of a D.C. power supply PS. The amount of wire extending from the holder and above arc a defines the extension or stick-out for welding wire 10. Power supply PS includes a positive output terminal 20 and a negative output terminal 22 in accordance with standard practice. Power switch 30 is cycled at approximately 20 KHz by pulse width modulator 32 of standard design having a control line 34 and a driving oscillator 36. Consequently, the voltage on the control line 34 indicates the width of the 20 KHz current pulses allowed to pass through switch 30. In this manner the welding current through welding wire 0 and across arc a, when an arc exists, i.e. during the arc condition of the welding cycle, is controlled by the various voltage responsive control circuits C1-C7 used separately or jointly as will be explained. The pulse width controlling voltage on line 34 is the D.C. voltage level at the output of an error amplifier 40 appropriately biased by resistor 42. An override or parallel circuit 44 is operated to maintain summing junction 50 at zero voltage by the voltage in line 34. The input of error amplifier 40 is the voltage at summing junction 50, which is controlled by a series of switches SW1-SW7 at the output side of control circuits C1-C7 through resistors R having the same parameters. The upper command signal circuits C1-C5 are used in conjunction with lower feedback signal circuits C6, C7 to feed and draw current from junction 50 so the current drawn from the error amplifier controls the voltage on modulator 32. The current flow balances the voltages between the command signal lines and the feedback signal lines. Background current is maintained at low level $I_B$, in practice about 20 amperes, by joint closing of switches SW5, SW7.

In accordance with prior practice, spatter control circuit 60 is operated in response to an impending fuse by a signal in line 62. This fuse signal is created by a dv/dt premonition circuit 63 so that the logic on output line 64 will render power switch 70 non-conductive immediately before a fuse is created during a short circuit or pinch pulse. Operation of switch 70 changes the flow of welding current through choke or inductor 72 from a general high level current through switch 70 to general low level current through a snubbing circuit 74. As the short circuit portion of a welding cycle progresses, the measured dv/dt exceeds a set value, indicative of an impending fuse, and the logic on line 62 shifts. The welding current from switch 70 is shifted to a low level to reduce the energy released by the fuse to reduce spatter. This concept does not form a part of the improvement constituting the present invention, which improvement samples the arc voltage at a precise time during the short circuit condition of the welding cycle and for a short time.

The width of the high frequency pulses allowed to pass through switch 30 by the output of pulse width modulator 32 is determined by the voltage at summing junction 50, which voltage is controlled by switches SW1-SW7 operated to control the welding current at various portions of the total welding cycle best shown in FIG. 4. The welding cycle is illustrated as extending between positions T0-T9. Variations can be made on this scheme of operation in accordance with the preferred embodiment of the present invention. To illustrate the function of switches SW1-SW7 the welding cycle is assumed to start at time T0 in FIG. 4. At time T0, a normal short is detected which activates PINCH control circuit C1 to activate switch SW1 in accordance with the programmed voltage profile for the current flow, as shown to the left of FIG. 1. This profile includes a relatively rapid slope for the initial current increase and then a relatively gradual slope for the final current increase until the fuse. These two slopes in the voltage profile at switch SW1 intersect at break point BP which is set at approximately 60% of the normal current level reached during the short circuit or pinch pulse of the welding circuit. The PINCH control circuit C1 has a time delay between time T0 and T1 at which a low current, or no current, is allowed to flow. This low welding current can be either a background current $I_B$ or no current. Thus, the detected short comes together by surface tension for a brief time (T0-T1) before high current can flow. At time T1, control circuit C1 allows actuated switch SW1 to control the current flow in the pinch pulse PP as illustrated in FIG. 4. Since this is a current flow condition, feedback voltage signal at CURRENT control C7 is applied to junction 50 through switch SW7 which is closed with switch SW1. Thus, during the pinch curve or pinch pulse PP, which is a shorted condition of the welding cycle, switches SW1, SW7 are closed. This arrangement of the COMMAND signal and FEEDBACK signal controls the current through power switch 30 in accordance with pulse width modulator 32 at the output of error amplifier 40. When the premonition circuit 63 indicates an upcoming break in the short circuit condition, i.e. a fuse, the logic in line 62 actuates spatter control 60 to deactivate switch 70 by output line 64. This occurs at time T5 which time will vary according to the time of the premonition output signal. This new control condition is initiated by deactivating switch SW1. After a time delay indicated as the distance between time T5 and time T6, the welding current is maintained at a low level which may be either a background current level by closing switch SW5 or no current. Consequently, after metal transfers to the weld pool, there is a slight delay before the power boost portion PB of the cycle is initiated at time T6. In accordance with the invention, which will be explained later, control of the welding current at time T6 is assumed by control circuit C3. The weld current is controlled by the voltages at control circuit C3, C6 by closing or actuating switches SW3, SW6. When this happens, a controlled wattage is used for adjusting the welding current flow through arc a between times T6 and T7, which time interval is the power boost portion PB of the welding cycle. This interval or duration is fixed. In the same fashion the time between T5 and T6 is fixed. After power boost portion PB, the plasma portion P of the welding cycle is initiated by actuating switches SW4, SW7. Thus, the current flow is controlled by the voltage signal at the plasma decay control circuit C4. In accordance with another aspect of the invention, control circuit C4 creates a voltage that allows a decay of the current level between times T7 and time T8. After a preset time or when a given energy has been used in the combined plasma boost PB and plasma portion P of the cycle, the background current level $I_B$ is initiated. This occurs by again activating switches SW5, SW7 so that the voltage at control circuit C5 takes over control of the welding current until the next short circuit occurs at time T0. The time during which the background current is controlled is indicated as time T8-T9. The welding cycle shown in FIG. 4 is repeated several times per second (100-400/sec) to control the welding process. For some of the voltage curves, a microprocessor senses the conditions and creates the voltage curves or profiles in the COMMAND signals as necessary for the profiling of the current during the welding cycle in accordance with standard practice. The procedure for creating these voltages can involve hard wired circuits as explained with regard to some of the control circuits.

Referring more specifically to control circuit C2, this circuit employs two steering gates 80, 82 having a common input line 84 which line is the plasma boost voltage control pulse between times T6, T7. A logic 1 exists in line 84 between times T6, T7 to enable both gates 80, 82. At the start of the welding procedure or welding run, a pulse S with a long duration is created in line 86, which line is a logic 1 at the start of the welding run. The inverted logic 0 is applied to line 88 at the output of the inverter 89 during the start-up of the welding procedure or the welding run. After a preselected time, determined by the duration of pulse S, which in practice this is 5.0 seconds, the logic on line 86 shifts to a logic 0, while line 88 shifts to a logic 1. This logic shift activates steering gate 82. By employing this type of input logic for the input voltages of control circuit C2, the successive plasma boost pulse PB during the first 5.0 seconds of operation are formed while a logic 0 appears in line 90. This start-up period has switches SW2, SW7 activated. Consequently, the feedback voltage at control circuit C7 represents the weld current and it is controlled by the command signal voltage level at rheostat 92. This command voltage gives a fixed power boost wattage for the first 5.0 seconds. During this time, the reference extension wattage is set as the weld current signal at switch SW7 is controlled in accordance with the fixed wattage determined by the setting of rheostat 92. This provides a ratiometric control so that a manual adjustment of the reference wattage is not required for each welding run. The ratio on the rheostat 92 controls the reference wattage setting procedure occurring during the first 5.0 seconds of the weld run or welding procedure.

After expiration of the initial start-up period, pulse S terminates and a logic 0 occurs in line 86. This disables gate 80 and causes a logic 1 to appear in line 88. Consequently, during each subsequent plasma boost pulse PB between times T6, T7, after the first 5.0 second, a logic 0 is on the output of gate 82 at line 94. The Boolean logic term is the inverted logic of ANDed B.P. and bar 5 Sec. This logic 0 activates switches SW3, SW6 while a change in logic on line 90 deactivates switches SW2, SW7. After the start-up period, switch SW2 is no longer employed by the control system A. Each plasma boost voltage command on line 84 activates switches SW3, SW6 for controlling the wattage during the power boost portion or pulse PB of the welding cycle.

Figure 7:
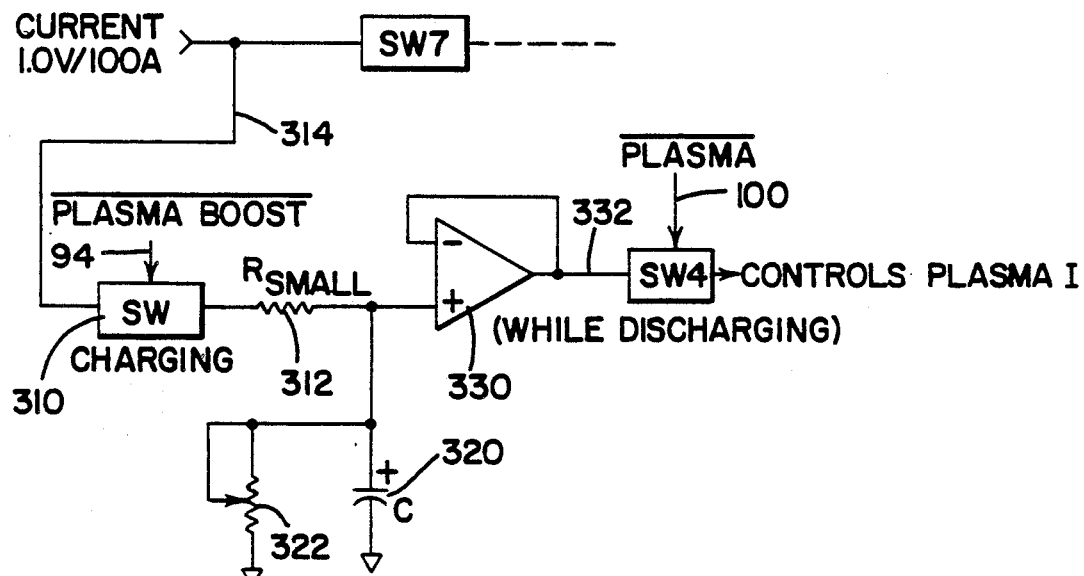
FIG. 7 is a combined wiring and block diagram illustrating another aspect of the present invention.

During the plasma portion P of the welding cycle, a logic 0 appears in line 100. At the same time, switch SW7 is activated to control the current flow between times T7, T8. A delay circuit, shown schematically and in hardwired form in FIG. 7, is employed for controlling the voltage profile of command signal used at control circuit C4. The background current $I_B$ after time T8 is controlled by the voltage level at rheostat 102 which is the command signal of circuit C5. The signal to initiate the background current appears on line 104 between times T8 and T0. At time T0, a logic 0 appears in line 110 to initiate a pinch pulse PP by control of the current flow between times T0–T5 by circuit C1. The voltage profile of control C1 is shown at the top of FIG. 1 and it essentially duplicated pulse PP as shown in FIG. 4. All of the control circuits C1–C7 could be hardwired circuits; however, in practice, they are provided both by hardwire and by the output of a microprocessor which controls the voltage at any given time for the command signals of control circuits C1–C5. The feedback signals of circuits C6, C7 are voltages representing a real time events. Various arrangements could be employed for the control circuits without departing from the present invention.

Referring now to FIG. 2, the present invention is illustrated wherein the instantaneous arc voltage is applied to circuit B at line 120. The instantaneous welding current is applied to the circuit at line 122. These real time parameters are measured parameters of the welding operation itself. In the microprocessor, there may be provided a circuit B as schematically illustrated in FIG. 2 or the circuit can be hardwired as shown. Use of a digital circuit or an actual hardwired circuit in accordance with normal technology does not change the inventive concepts. Digital switch 130 is closed during the short time between T3, T4. This short time is immediately after the break point BP occurring at time T2 under the control of circuit C1, shown in FIG. 1. After break point BP, the welding current is controlled along a more gradual slope 190, best shown in FIG. 3. A measurement of the arc voltage is taken between times T3, T4 on this more gradual current slope. This selection of a precise measurement point produces a relatively consistent voltage, since the current at break point BP is fixed and slope 192 is gradual, as shown in FIG. 3. Switch 130 is closed during the period between times T3, T4 which period is a fixed time, such as approximately 300 microseconds. Time T3 is spaced from the break point time T2 by a lesser amount time, such as about 100 microseconds. Thus, the voltage between times T3, T4 is measured during a time of relatively fixed, known current flow. Thus, the voltage measurement between these T3, T4 is the extension or stick out voltage for wire 10. This is axiomatic because the measurement is taken during the pinch pulse PP which is a short circuit. All the voltage at line 120 is the voltage in the wire between holder 14 and workpiece 12. By taking a voltage spike measurement immediately after break point BP during a gradual current slope at a short and for a fixed period of time, the magnitude of the voltage spike is consistently close to the real time stick out or extension voltage. Consequently, as switch 130 is closed between T3, T4 a thin voltage spike 200 is created, such as shown in the bottom portion of FIG. 3. This spike is the extension voltage, since the curve 190 for a very short period between times T3, T4 is insignificant and will be the same during each pinch pulse PP. In addition, since this voltage spike measurement is taken at a precise time on the pinch pulse, immediately after break point BP, a gradual slope and accuracy is assured.

Figure 5:
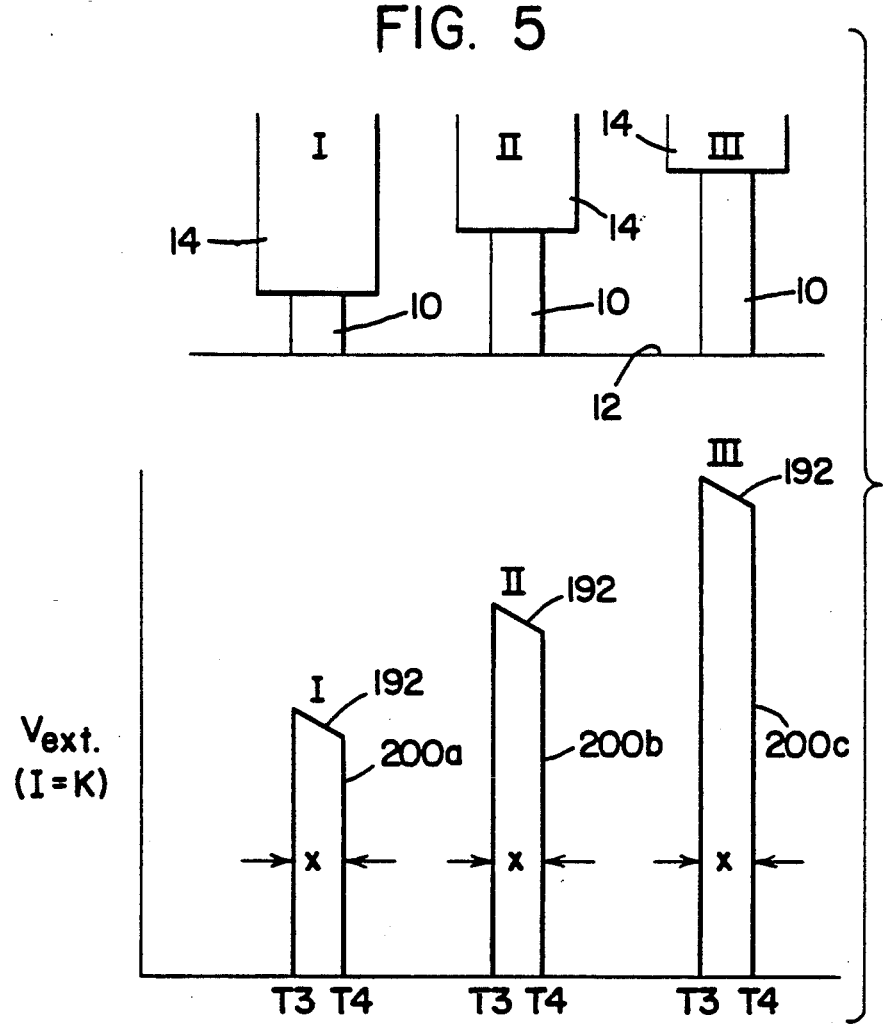
FIG. 5 is a schematic diagram illustrating several extension or stick out conditions together with a voltage graph illustrating representative voltage measuring spikes or pulses obtained when the extension or stick out charges.

Referring now to FIG. 5, as the extension or stick out is changed between those shown as I, II and III, the measured voltage spikes 200i a, 200b and 200c are correspondingly changed. The magnitudes of these voltage spikes, which have a fixed width x, are measurements of the extension voltage or stick out voltage. The magnitude increases as the stick out or extension increases. Thus, the output of switch 130 is a plurality of voltage pulses or spikes, each representing the extension voltage during a given welding cycle. A switch 132 operates in unison with switch 130 for a purpose to be described. The voltage on line 140 is the average of subsequent voltage spikes 200, as accumulated by an appropriate voltage averaging device 142, shown as capacitor C1. A second voltage averaging device 150, in the form of capacitor C2, receives voltage spikes from switch 132. Resistors 160, 162 control the rate of charging for capacitor C1, C2, respectively. In practice, capacitors C1, C2 are charged to approximately 60% of a peak current during the pinch portion of the welding cycle in approximately 16–20 welding cycles. This charging rate is schematically illustrated in FIG. 2A. The averaged current for prior voltage spikes 200 appears in line 140. The instantaneous welding current appears in line 122. These two voltage values are multiplied by a multiplying circuit 170 having an output 172. This output is a voltage representing the extension wattage used as the control for switch SW6 and form the control circuit C6 in FIG. 1. The voltage in line 172 is the product of the arc current and the average extension voltage. This gives a wattage signal. A sample and hold circuit 180 has an output 182 which forms control circuit C3 at the input of switch SW3. As so far described, the output voltage on line 182 is compared to the voltage on line 172 when switches SW3, SW6 are activated by logic on line 194, during a power boost portion of the welding cycle. The welding current is controlled to make these values equal at junction 50.

As shown in FIG. 2, a switch 184 schematically represents the start-up pulse in line 86. While this switch is closed, switches 130, 132 charge capacitor C2. After a preselected time at the start of the welding procedure, switch 184 opens so that the average extension wattage determined by the voltage in line 182 is a fixed ratiometric voltage against which subsequent wattage measurements in line 182 are compared during the power boost pulse PB.

In operation, during the first 5.0 seconds of the welding procedure, switch SW2 is activated with switch SW7. During each pinch pulse PP in the start-up period, a spike 200 is created which measures the actual extension voltage. These spikes are applied to averaging device 142 (capacitor C1). The average of these spikes appears in line 140 and is multiplied by the current controlling the voltage on line 122. Thus, the voltage in line 172 is the voltage level indicative of the product of the average of the prior spikes 200 and the instantaneous welding current on line 122. Switch 184 is closed; thus, switch 132 produces wattage spikes similar to the voltage spikes 200 and occurring at the same time. These wattage spikes from switch 132 are averaged by capacitor C2. A sample and hold device 180 retains the voltage on capacitor C2 immediately after switch 184 is opened. In practice, switches 130, 132 are operated in unison. This produces an accurate correlation between the voltage spikes 200 directed to capacitor C1 and the wattage spikes applied to capacitor C2. These spikes are essentially the same except the level of voltage on capacitor C2 is a multiple of the then existing welding current on line 122 so that the magnitude is representative of extension wattage as opposed to merely extension voltage. The reference extension wattage is thus created at the output line 182 of sample and hold circuit 180. This reference is created with switches SW2, SW7 closed by line 90. Consequently, the weld current in line 122 is controlled to give a fixed wattage based on extension voltage in line 140 which is controlled by the position in which the operator holds the wire holder 14 during the start-up period.

After the start-up period, switch 184 is opened for the remainder of the welding cycle. The instantaneous extension wattage on line 172 is compared to the reference extension wattage on line 182 for controlling the welding current during the power boost pulse PB. Thus, the welding current is adjusted to compensate for variations in the extension or stick out voltage controlled by the amount of extension or stick out. A fixed amount of watts are introduced into the wire during each plasma boost portion. The period between T6, T7 is a fixed time; therefore, the energy during the power boost pulse or portion PB is controlled. This produces a fixed melting wattage in the wire during each power boost pulse. The total joules into the wire can be controlled by terminating the plasma at a fixed time T8 by control circuit C4 shown in FIG. 1. Termination of the plasma can be based upon input energy with a time limit override.

Figure 6:
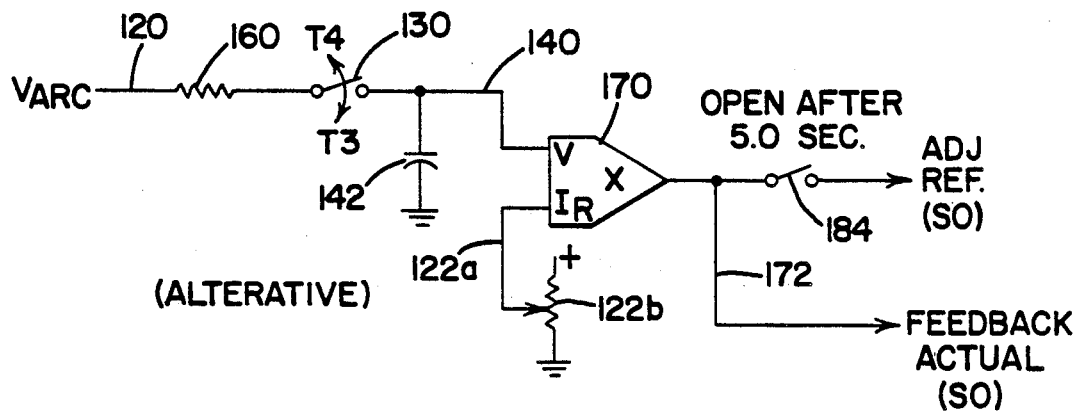
FIG. 6 is a wiring diagram showing a modification of the present invention to illustrate a broader aspect of the invention which may be used in various environments.

Referring to the modification illustrated in FIG. 6, like components have the same numbers. In this embodiment, the current signal or voltage level on line 122 is replaced by a fixed voltage in line 122a controlled by a potentiometer 122b. The remainder of the circuit is the same as shown in FIG. 2. A reference level for the stick out voltage is sampled and then retained after switch 184 is opened. During operation of the welding system, the wattage on line 172 is essentially the average voltage of subsequent voltage spikes 200 multiplied by a fixed value representing an adjustable current level. This modification is illustrated to show various, broader aspects of the present invention. Several uses can be made of the concept of a precisely spaced small voltage sample taken during a short circuit pulse or pinch pulse PP of the welding cycle to measure the existing stick out or extension for wire 10. This sampling concept can be employed in systems for controlling the stick out or for adjusting the extension wattage.

Figure 8:
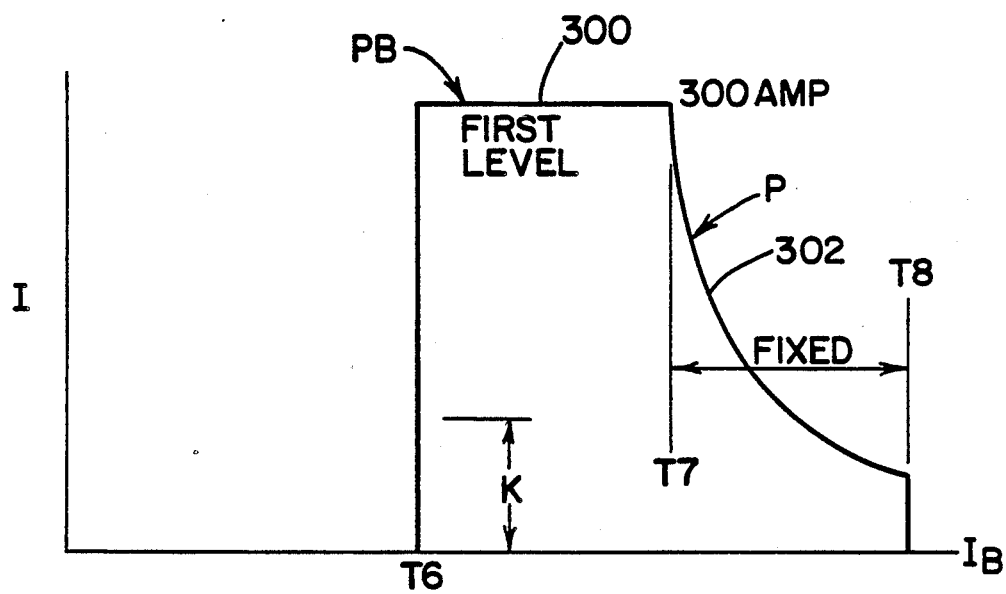
FIG. 8 is a current graph of the plasma pulse of a welding cycle employing the aspect of the invention shown in FIG. 7.

In FIG. 7, a circuit is illustrated for controlling switches SW4, SW7 during the plasma portion P of the welding cycle between times T7, T8. The plasma boost PB occurs at a relatively fixed high first current level, illustrated as level 300 in FIG. 8. This level is indicated to be approximately 300 amperes by the end of the power boost pulse PB. A decaying current level 302 gradually decreases the welding current from the 300 ampere upper level 300 toward the background current level. At time T8, which may be fixed or adjusted by a Joule meter, the plasma portion P of the cycle is terminated. The welding current is then immediately shifted to the background level which may be slightly above zero current. In this fashion, the abrupt shift of current, if any, occurs at a low current level and not at a high current level as would be the situation if the plasma portion P involved an immediate shift from a high level 300 to a low plasma level between level 300 and the background current. A variety of circuits could be provided for forming the gradual current level decay, shown as line 302 in FIG. 8. A representative circuit for this purpose is illustrated in FIG. 7. A switch 310 charges capacitor 320 through resistor 312. The voltage on line 314 is applied to capacitor 320 by switch 310 and has a ratio of 1.0 volts per 100 amperes during the plasma boost pulse PB. This plasma boost current represented by level 300 in FIG. 8 is stored on capacitor 320 during the plasma boost portion of the cycle. After plasma boost portion of the cycle, switch 310 is deactivated. At that time, capacitor 320 is discharged through rheostat 322. This voltage is amplified by amplifier 330 and appears at line 332 which is the voltage profile of control circuit C4 shown in FIG. 1 at switch SW4. The voltage on line 332 controls the weld current so the voltage at switch SW7 matches the voltage on line 332 during the plasma portion of the welding cycle between times T7, T8. This prevents an abrupt change in current from high level 300.

Figure 9:
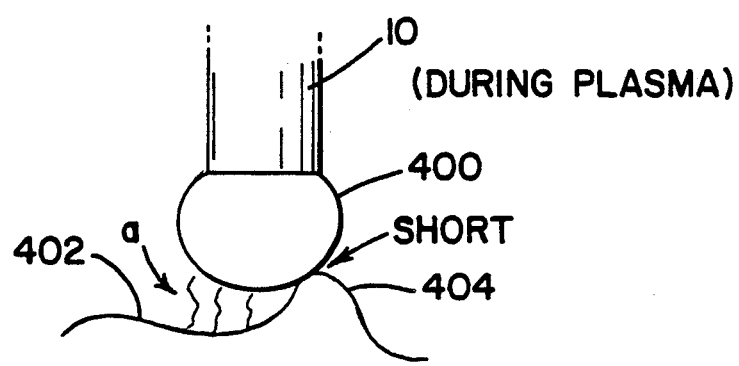
FIG. 9 is a partial, side elevational view illustrating an inadvertent short during the plasma pulse of a welding cycle for which another aspect of the invention is provided.
Figure 11:
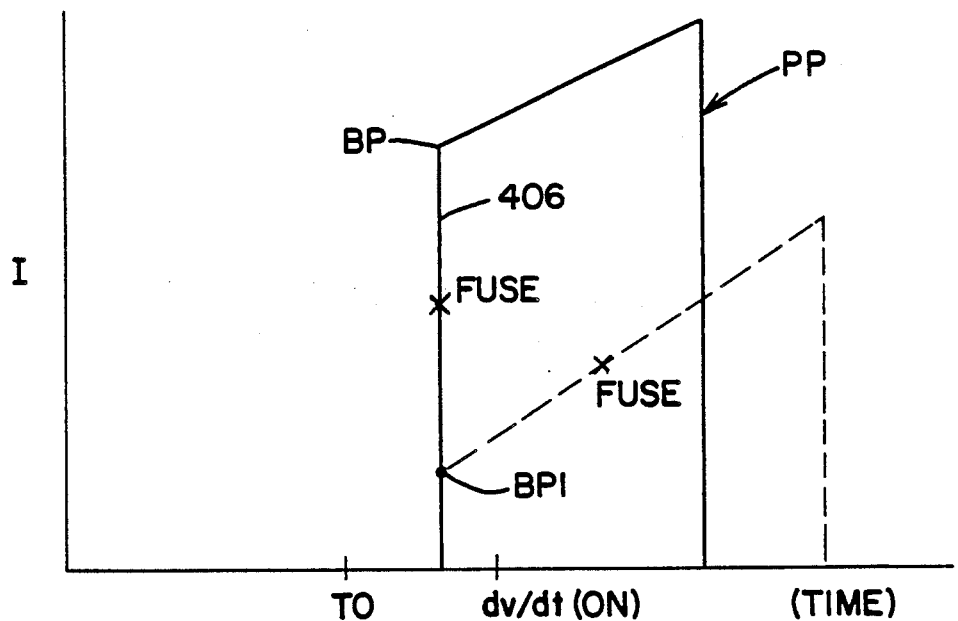
Figure 10:
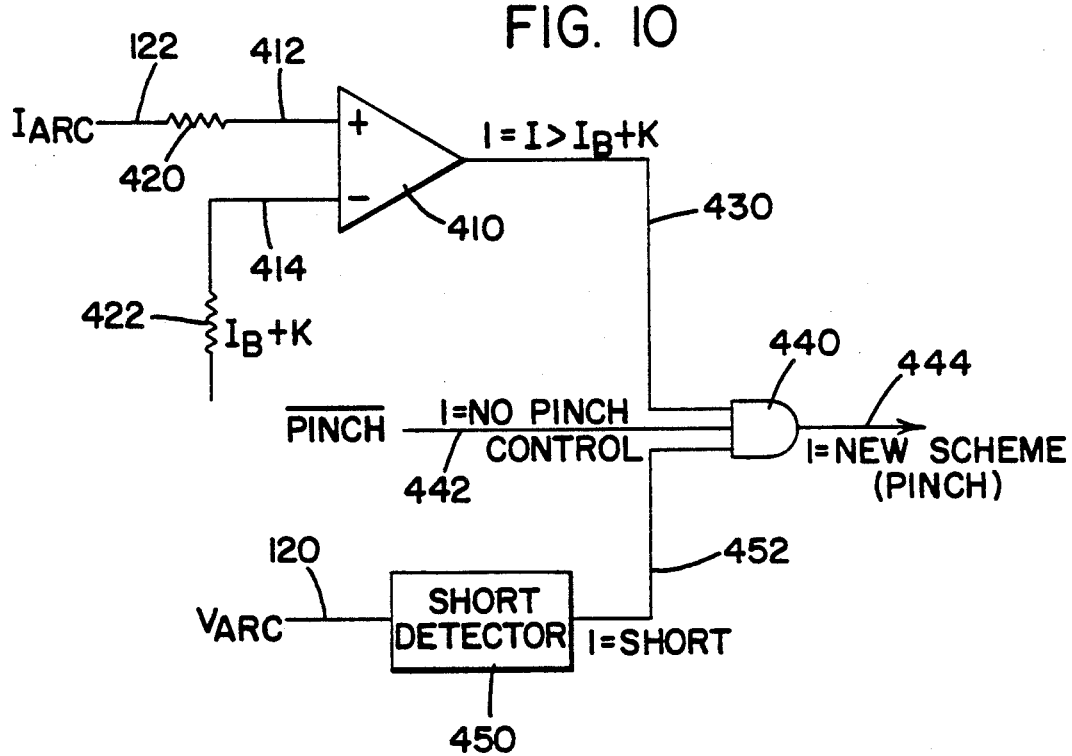
FIG. 10 is a partial wiring diagram illustrating a modification of the preferred embodiment of the invention to compensate for an inadvertent short circuit as illustrated in FIG. 9; and, FIG. 11 is a schematic representation of a pinch pulse PP of a welding cycle with a modification of this pulse as a result of an inadvertent, premature short circuit as illustrated in FIG. 9 while using the circuit shown in FIG. 10.

Another aspect of the invention is illustrated in FIGS. 9–11 wherein a molten metal ball 400 is created on the of wire 10 and above molten metal pool 402. During an arcing condition of the welding cycle, arc a is illustrated as creating a wave 404 that engages ball 400 and creates an inadvertent short circuit. This short circuit occurs during the melting portion of the welding cycle, either during the plasma boost PB or the decaying plasma P. As shown in FIG. 11, as soon as a short occurs, the resistance is drastically reduced and the current increases along a steep line 406. This happens in a short time. The pinch pulse is started. Since there is a relatively minor area of the short circuit, the initial rapid increase of pinch current at the start of pulse PP immediately creates a fuse that explodes. The current is at a relatively high value. This causes spatter. Due to the rapid increase of current, there is no time for the dv/dt premonition circuit to be activated for creating a signal in line 62 to discontinue operation of switch 70. The time delay to time T1 is overridden. The fuse occurs before the break point BP due to the small area of the short. To anticipate such inadvertent shorting during the arcing condition, the illustrated system includes the circuit schematically set forth in FIG. 10 which monitors current line 120 by a comparator 410. Inputs 412, 414 compare the voltages of resistors 420, 422 to create an output in line 420 when the instantaneous arc current is greater than background current plus a fixed constant K. This constant is above the current level between times T8–T0 and is at a level which would occur only during the current levels 300, 302 as shown in FIG. 8. Thus, a logic 1 on line 430 indicates a current substantially higher than the background level. This voltage is applied to one input of AND gate 440. The other input is PINCH control line 442 which is a logic 1 when there is no pinch pulse being processed. A short detector 450 is a voltage detector indicating a rapid rise in voltage. A rapid rise in arc voltage indicates a short condition as created by an inadvertent short as shown in FIG. 9. A logic 1 in line 452 indicates a short. If this short occurs at a time other than the PINCH time and at a time when the current level is greater than the value established by resistor 422, a logic 1 appears in output line 430. This immediately shifts the control circuit C1 shown in FIG. 1 to the dashed line condition wherein the break point BP1 is reduced to a level about 20% of the original break point current BP. Thus, the rapid increase of current occurs for a very short time until the new break point current level BP1 is reached. Then the slope of the PINCH curve, shown in the dashed line in FIG. 11, shifts to the second gradual slope. The fuse occurs later. In this manner, the premonition circuit can be activated to monitor the occurrence of the subsequent fuse. By using a circuit such as illustrated in FIG. 10, inadvertent shorting during the arcing condition causes a shift in the control circuit for the pinch curve to reduce, substantially, the break point BP between the rapid current slope and the gradual current slope.

Since the present invention adjusts the welding current to maintain a fixed wattage across the extension with changes in extension, it can be used to change the heat energy introduced into the workpiece. As the extension is increased, less current is called upon to maintain the fixed wattage. Thus, by increasing the extension less $I^2R$ heating occurs in the workpiece. In a like manner, by intentionally decreasing the extension, less resistance is in the welding wire and more welding current flows to maintain the fixed wattage. By merely changing the extension, the heat input to the workpiece can be changed. This is a further advantage and use of the present invention.

Having thus defined the invention, the following is claimed:

1. In a short circuiting arc welding apparatus comprising a D.C. power supply means for causing a welding current of different levels to pass through a welding wire extending variable extension distances from a holder and between said wire and a workpiece at a molten metal pool on said workpiece, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, the improvement comprising: means for creating a current pulse upon initiation of said arcing condition, said current pulse having a first occurring plasma boost portion with a current increasing to a first general current level and a second occurring plasma portion with a reduced current creating means for applying a low level background current between said wire and said workpiece after termination of said current pulse and until the next short circuit condition of said welding cycle and control means for maintaining a generally constant wattage in said wire during said plasma boost portion as said extension distances change.

2. The improvement as defined in claim 1 wherein said control means includes means for creating an extension reference wattage, mean for creating a control signal proportional to the voltage through said wire for the existing extension distance of said wire, means for multiplying said control signal by the welding current through said wire during said plasma boost portion to create an instantaneous extension wattage and means for adjusting said welding current to cause said instantaneous extension wattage to approach said extension reference wattage.

3. The improvement as defined in claim 2 wherein said control signal creating means includes sampling means for measuring the voltage level across said holder and said workpiece for a short time and at a precise time during said short circuit condition and means for using said measured voltage to create said control signal.

4. The improvement as defined in claim 3 wherein said means for using said measured voltage levels includes a voltage accumulator means for adjusting said control signal toward said measured voltage during successive shorting conditions.

5. The improvement as defined in claim 4 including pinch control means for causing said welding current to follow a given curve during said short circuit condition and said sampling means including means for controlling said precise time as a position on said given curve.

6. The improvement as defined in claim 5 wherein pinch control means includes means for causing said welding current to follow a first high slope and then a second low slope with said slopes intersecting at a break point and said precise time being immediately after said break point on said given curve of said welding current during said short circuit condition.

7. The improvement as defined in claim 6 wherein said short time is less than 500 microseconds.

8. The improvement as defined in claim 7 wherein said precise time is less than 200 microseconds after said break point.

9. The improvement as defined in claim 8 wherein said extension reference creating means includes means for activating said reference creating means for a given time at the start of a given welding procedure, means for controlling the welding current during the plasma boost portions of successive welding cycles to maintain a fixed wattage during said plasma boost portions during said given time, means for storing the product of said measured voltage levels and said welding current during said given time, and means for using said product as said extension reference wattage for said given welding procedure.

10. The improvement as defined in claim 4 wherein said extension reference creating means includes means for activating said reference creating means for a given time at the start of a given welding procedure, means for controlling the welding current during the plasma boost portions of successive welding cycles to maintain a fixed wattage during said plasma boost portions during said given time, means for storing the product of said measured voltage levels and said welding current during said given time, and means for using said product as said extension reference wattage for said given welding procedure.

11. The improvement as defined in claim 3 wherein said extension reference creating means includes means for activating said reference creating means for a given time at the start of a given welding procedure, means for controlling the welding current during the plasma boost portions of successive welding cycles to maintain a fixed wattage during said plasma boost portions during said given time, means for storing the product of said measured voltage levels and said welding current during said given time, and means for using said product as said extension reference wattage for said given welding procedure.

12. The improvement as defined in claim 3 including pinch control means for causing said welding current to follow a given curve during said short circuit condition and said sampling means including means for controlling said precise time as a position on said given curve.

13. The improvement as defined in claim 12 wherein said extension reference creating means includes means for activating said reference creating means for a given time at the start of a given welding procedure, means for controlling the welding current during the plasma boost portions of successive welding cycles to maintain a fixed wattage during said plasma boost portions during said given time, means for storing the product of said measured voltage levels and said welding current during said given time, and means for using said product as said extension reference wattage for said given welding procedure.

14. The improvement as defined in claim 13 wherein pinch control means includes means for causing said welding current to follow a first high slope and then a second low slope with said slopes intersecting at a break point and said precise time being immediately after said break point on said given curve of said welding current during said short circuit condition.

15. The improvement as defined in claim 3 wherein said short time is less than 500 microseconds.

16. The improvement as defined in claim 15 wherein said extension reference creating means includes means for activating said reference creating means for a given time at the start of a given welding procedure, means for controlling the welding current during the plasma boost portions of successive welding cycles to maintain a fixed wattage during said plasma boost portions during said given time, means for storing the product of said measured voltage levels and said welding current during said given time, and means for using said product as said extension reference wattage for said given welding procedure.

17. A method of maintaining a generally constant voltage in a welding wire as the extension of said wire varies during plasma boost portions of successive weld cycles during a welding procedure including a succession of short circuit conditions, plasma boost portion and plasma conditions each having a controlled welding current and said short circuit conditions having a given current curve, said method comprising the steps of:
 (a) creating a first reference signal proportional to a desired wattage value during successive plasma boost portions of said welding procedure;
 (b) measuring the voltage level across said extension for said welding wire for a short time and at a precise location on said given current curve during said successive short circuit conditions;
 (c) averaging said measured voltage levels;
 (d) multiplying said average of said voltage levels with said instantaneous welding current to provide a second signal representative of the wattage during said successive plasma boost portions of said welding procedure; and
 (e) adjusting said welding current during said successive plasma boost portions to cause said second signal to approach said first reference signal.

18. The method as defined in claim 17 wherein said reference signal creating step includes the steps of:
 (f) during an initial portion of said welding procedure, measuring the voltage level across said extension of said welding wire for a short time and at a precise location on said given current curve during said successive short conditions;
 (g) averaging said measured voltage levels during said initial portions of said welding procedure;
 (h) controlling said welding current during successive plasma boost conditions to maintain a fixed wattage during said successive plasma boost conditions during said initial portion of said welding procedure; and
 (i) storing a signal controlled by said voltage level averaged during said initial portion of said welding procedure as said first reference signal.

19. A system for maintaining a generally constant wattage in a welding wire as the extension of said wire varies during plasma portions of successive cycles during a welding procedure including a succession of short circuit conditions and plasma conditions having a controlled welding current, said short circuit conditions having a given current curve, said system comprising:
 (a) means for creating a first reference signal proportional to a desired wattage value during successive plasma portions of said welding procedure;
 (b) means for measuring the voltage level across said extension of said welding wire for a short time and at a precise location on said given current curve during said successive short circuit conditions;
 (c) means for averaging said measured voltage levels;
 (d) means for multiplying said average of said voltage levels with said instantaneous welding current to provide a second signal representative of the wattage during said successive plasma portions of said welding procedure; and,
 (e) means for adjusting said welding current during said successive plasma portions to cause said second signal to approach said first reference signal.

20. The system as defined in claim 19 wherein said reference signal creating means includes:
 (f) means for measuring the voltage level across said extension of said welding wire for a short time and at a precise location on said given curve during said successive short conditions during an initial portion of said welding procedure;
 (g) means for averaging said measured voltage levels during said initial portions of said welding procedure;
 (h) means for controlling said welding current during successive plasma conditions to maintain a fixed wattage during said successive plasma conditions during said initial portion of said welding procedure; and,
 (i) means for storing a product of said voltage level averaged during said initial portion of said welding procedure and said welding current as said first reference signal.

21. In a short circuiting arc welding apparatus comprising a D.C. power supply means for causing a welding current of different levels to pass through a welding wire extending from a holder and between said wire and a workpiece at a molten metal pool on said workpiece, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, the improvement comprising: means for creating a current pulse upon initiation of said arcing condition, said current pulse having a first occurring plasma boost portion with a current increasing to a first general current level and a second occurring plasma portion with a second general current level, said first general current level being at a controlled high current level and said second general current level having a curve gradually decreasing from said controlled high current level.

22. The improvement as defined in claim 21 including means for changing said curve.

23. The improvement as defined in claim 22 including means for adjusting said first general level to control the instantaneous wattage during said plasma boost portion.

24. The improvement as defined in claim 21 including means for adjusting said first general level to control the instantaneous wattage during said plasma boost portion.

25. In a short circuiting arc welding apparatus comprising a D.C. power supply means for causing a welding current of different levels to pass through a welding wire extending variable distances from a holder and between said wire and a workpiece at a molten metal pool on said workpiece, said current flowing in response to an arc voltage whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition which said molten metal ball on the end of said wire first contacts said molten metal pool and then transfers from said wire to said workpiece by a necking action breaking said molten metal ball from said wire to initiate a arc in a subsequent welding cycle, means for controlling the shape of the current pulse when said wire first contacts said metal pool, said shape being a first rapidly increasing current portion and a subsequent, second gradually increasing current portion with said portions intersecting at a break point, the improvement comprising: control means for reducing the current level of said break point, said control means responsive to detection for a short circuit during said arcing condition.

26. In a short circuiting arc welding apparatus comprising a D.C. power supply means for causing a welding current of different levels to pass through a welding wire extending variable distances from a holder and between said wire and a workpiece at a molten metal pool on said workpiece, said current flowing in response to an arc voltage whereby said welding wire is subjected to a succession of welding cycles, each of said welding cycles including an arcing condition during which said wire is spaced from said pool and the power applied to said wire raises the temperature at the end of said wire to a molten temperature to form a molten metal ball on the end of said wire, and a short circuit condition during which said molten metal ball on the end of said wire first contacts said molten metal pool and then transfers from said wire to said workpiece by a necking action breaking said molten metal ball from said wire to initiate an arc in a subsequent welding cycle, the improvement comprising: means for creating a plasma boost current pulse at the start of the arcing condition of successive ones of said welding cycles, means for maintaining said applied power by controlling the welding current during said plasma boost current pulses to provide a predetermined wattage in said wire during each said plasma boost current pulses and means for terminating said power boost pulse after a selected time.

27. The improvement as defined in claim 26 wherein said predetermined wattage is the same for each of said plasma boost current pulses in a welding run.

28. In an arc welding apparatus comprising a D.C. power supply means for causing a welding current of different levels to pass through a welding wire extending variable extension distances from a holder and between said wire and a workpiece at a molten metal pool on said workpiece, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece, the improvement comprising: means for creating a current pulse upon initiation of said arcing condition, said current pulse having a first occurring plasma boost portion with a current at a first general current level, means for applying a low level background current between said wire and said workpiece after termination of said current pulse and until the next short circuit condition of said welding cycle and control means for maintaining a generally constant wattage in said wire during said plasma boost portion as said extension distances change whereby said extension can be adjusted to change the welding current flow in the workpiece.

29. The improvement as defined in claim 28 wherein said control means includes means for creating an extension reference wattage, mean for creating a control signal proportional to the voltage through said wire for the existing extension distance of said wire, means for multiplying said control signal by the welding current through said wire during said plasma boost portion to create an instantaneous extension wattage and means for adjusting said welding current to cause said instantaneous extension wattage to approach said extension reference wattage.

30. The improvement as defined in claim 29 wherein said control signal creating means includes sampling means for measuring the voltage level across said holder and said . workpiece for a short time and at a precise time during said short circuit condition and means for using said measured voltage to create said control signal.

31. The improvement as defined in claim 30 wherein said means for using said measured voltage levels includes a voltage accumulator means for adjusting said control signal toward said measured voltage during successive shorting conditions.

32. The improvement as defined in claim 31 including pinch control means for causing said welding current to follow a given curve during said short circuit condition and said sampling means including means for controlling said precise time as a position on said given curve.

33. The improvement as defined in claim 32 wherein pinch control means includes means for causing said welding current to follow a first high slope and then a second low slope with said slopes intersecting at a break point and said precise time being immediately after said break point on said given curve of said welding current during said short circuit condition.

34. The improvement as defined in claim 30 wherein said extension reference creating means includes means for activating said reference creating means for a given time at the start of a given welding procedure, means for controlling the welding current during the plasma boost portions of successive welding cycles to maintain a fixed wattage during said plasma boost portions during said given time, means for storing the product of said measured voltage levels and said welding current during said given time, and means for using said product as said extension reference wattage for said given welding procedure.

35. The improvement as defined in claim 30 including pinch control means for causing said welding current to follow a given curve during said short circuit condition, and said sampling means including means for controlling said precise time as a position on said given curve.

36. The improvement as defined in claim 35 wherein said extension reference creating means includes means for activating said reference creating means for a given time at the start of a given welding procedure, means for controlling the welding current during the plasma boost portions of successive welding cycles to maintain a fixed wattage during said plasma boost portions during said given time, means for storing the product of said measured voltage levels and said welding current during said given time, and means for using said product as said extension reference wattage for said given welding procedure.

37. The improvement as defined in claim 36 wherein pinch control means includes means for causing said welding current to follow a first high slope and then a second low slope with said slopes intersecting at a break point and said precise time being immediately after said break point on said given curve of said welding current during said short circuit condition.

38. In a short circuiting arc welding apparatus comprising a D.C. power supply means for causing a welding current of different levels to pass through a welding wire extending from a holder and between said wire and a workpiece at a molten metal pool on said workpiece, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, the improvement comprising: means for creating a current pulse upon initiation of said arcing condition, said current pulse having a first occurring plasma boost portion with a current increasing to a first general current level and a second occurring plasma portion with a second general current level, said first general current level being at a controlled high current level and said second general current level decreasing gradually from said controlled high current level.

39. The improvement as defined in claim 38 wherein said second level includes a time constant curve.

40. The improvement as defined in claim 38 including means for adjusting said first general level to control the instantaneous wattage during said plasma boost portion.

41. The improvement as defined in claim 38 including means for adjusting said first general level to control the instantaneous wattage during said plasma boost portion.

* * * * *